US012586342B2

(12) United States Patent
Oura

(10) Patent No.: US 12,586,342 B2
(45) Date of Patent: Mar. 24, 2026

(54) INFORMATION PROCESSING APPARATUS THAT PERFORMS MACHINE LEARNING OF LEARNING MODEL, LEARNING METHOD, AND STORAGE MEDIUM

(71) Applicant: CANON KABUSHIKI KAISHA, Tokyo (JP)

(72) Inventor: Hayato Oura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1394 days.

(21) Appl. No.: 17/219,582

(22) Filed: Mar. 31, 2021

(65) Prior Publication Data

US 2021/0312239 A1 Oct. 7, 2021

(30) Foreign Application Priority Data

Apr. 7, 2020 (JP) ................................. 2020-069286

(51) Int. Cl.
| | |
|---|---|
| *G06N 20/00* | (2019.01) |
| *G06F 18/21* | (2023.01) |
| *G06F 18/22* | (2023.01) |
| *G06N 3/08* | (2023.01) |
| *G06V 10/50* | (2022.01) |
| *G06V 10/764* | (2022.01) |
| *G06V 10/82* | (2022.01) |

(52) U.S. Cl.
CPC .......... *G06V 10/50* (2022.01); *G06F 18/2163* (2023.01); *G06F 18/22* (2023.01); *G06N 3/08* (2013.01); *G06V 10/764* (2022.01); *G06V 10/765* (2022.01); *G06V 10/82* (2022.01)

(58) Field of Classification Search
CPC ...... G06V 10/50; G06V 10/765; G06V 10/82; G06V 10/764; G06N 3/08
See application file for complete search history.

(56) References Cited

U.S. PATENT DOCUMENTS

2020/0175375 A1* 6/2020 Chen ...................... G06N 3/045

FOREIGN PATENT DOCUMENTS

| | | |
|---|---|---|
| JP | 2018-182531 A | 11/2018 |
| WO | WO-2019107881 A1 * 6/2019 | ............... G06N 3/04 |

OTHER PUBLICATIONS

X. Liu et al., "An Adaptive CU Size Decision Algorithm for HEVC Intra Prediction Based on Complexity Classification Using Machine Learning," Jan. 2019, IEEE Transactions On Circuits and Systems for Video Technology, vol. 29, No. 1, (Year: 2019).*
S. Bouaafia et al., "Fast CU partition-based machine learning approach for reducing HEVC complexity," Feb. 2020, Journal of Real-Time Image Processing (2020) 17:185-196 (Year: 2020).*

* cited by examiner

*Primary Examiner* — Kakali Chaki

(74) *Attorney, Agent, or Firm* — Canon U.S.A., Inc. IP Division

(57) ABSTRACT

An apparatus that performs machine learning of a learning model that can increase a rate of outputting a block dividing pattern as a correct answer. A CPU of the apparatus determines a dividing pattern output from a learning model that outputs, using an image for learning as an input thereto, a dividing pattern obtained by dividing the image, and a weight associated with a similarity with teacher data when performing machine learning of the learning model. The CPU performs machine learning of the learning model using a loss function weighted by the determined weight.

18 Claims, 8 Drawing Sheets

2f

2i

2e

2k

2q

2d

2j

2p

2c

2i

2o

2b

2h

2n

2a

2g

2m

TEACHER DATA

SIMILAR GROUP 1

TEACHER DATA

SIMILAR GROUP 1

INFORMATION PROCESSING APPARATUS THAT PERFORMS MACHINE LEARNING OF LEARNING MODEL, LEARNING METHOD, AND STORAGE MEDIUM

BACKGROUND OF THE DISCLOSURE

Field of the Disclosure

The aspect of the embodiments relates to an information processing apparatus that performs machine learning of a learning model, a learning method, and a storage medium.

Description of the Related Art

A moving image is compressed using a moving image compression standard referred to as H. 265 (ISO/IEC 23008-2). The H. 265 standard is also referred to as HEVC (High Efficiency Video Coding). In HEVC, an image to be encoded (encoding target image) is divided into the blocks of CTUs (Coding Tree Units) each having a size of 64×64 pixels vertically and horizontally, and encoding is performed on a block-by-block basis. Further, in HEVC, the CTU is recursively divided into the blocks of CUs (Coding Units) as the encoding processing units. Each CU has one of sizes of 64×64 pixels vertically and horizontally, 32×32 pixels vertically and horizontally, 16×16 pixels vertically and horizontally, and 8×8 pixels vertically and horizontally. A block dividing pattern of each CTU is determined according to a combination of divided shapes of CU blocks.

As a related art, there has been proposed a technique in Japanese Laid-Open Patent Publication (Kokai) No. 2018-182531. In the technique disclosed in Japanese Laid-Open Patent Publication (Kokai) No. 2018-182531, a learning model outputs a label indicating a probability of dividing each node of a quadtree data structure based on the divided shapes of the CUs of the input CTU and learning parameters.

Although in the technique disclosed in Japanese Laid-Open Patent Publication (Kokai) No. 2018-182531, the probability of dividing each node of the quadtree data structure is learned, there is a possibility that the learning model does not output a block dividing pattern close to a block dividing pattern as a correct answer. Therefore, in a case where the learning model outputs a block dividing pattern largely different from the block dividing pattern as the correct answer, encoding of a moving image is performed using the output block dividing pattern, which significantly degrades image quality of the moving image.

SUMMARY OF THE DISCLOSURE

In a first aspect of the embodiments, there is provided an information processing apparatus including at least one processor; and a memory coupled to the at least one processor, the memory having instructions that, when executed by the processor, perform the operations as:

a determination unit configured to determine a dividing pattern output from a learning model that outputs, using an image for learning as an input thereto, a dividing pattern obtained by dividing the image, and a weight associated with a similarity with teacher data when performing machine learning of the learning model, and a learning unit configured to perform machine learning of the learning model using a loss function weighted by the determined weight.

In a second aspect of the embodiments, there is provided a method comprising determining a dividing pattern output from a learning model that outputs, using an image for learning as an input thereto, a dividing pattern obtained by dividing the image, and a weight associated with a similarity with teacher data when performing machine learning of the learning model, and performing machine learning of the learning model using a loss function weighted by the determined weight.

Further features of the disclosure will become apparent from the following description of exemplary embodiments (with reference to the attached drawings).

DESCRIPTION OF THE EMBODIMENTS

The disclosure will now be described in detail below with reference to the accompanying drawings showing embodiments thereof. However, the configurations described in the following embodiments are described by way of example, and are by no means intended to limit the scope of the disclosure to the described configurations.

Figure 1:
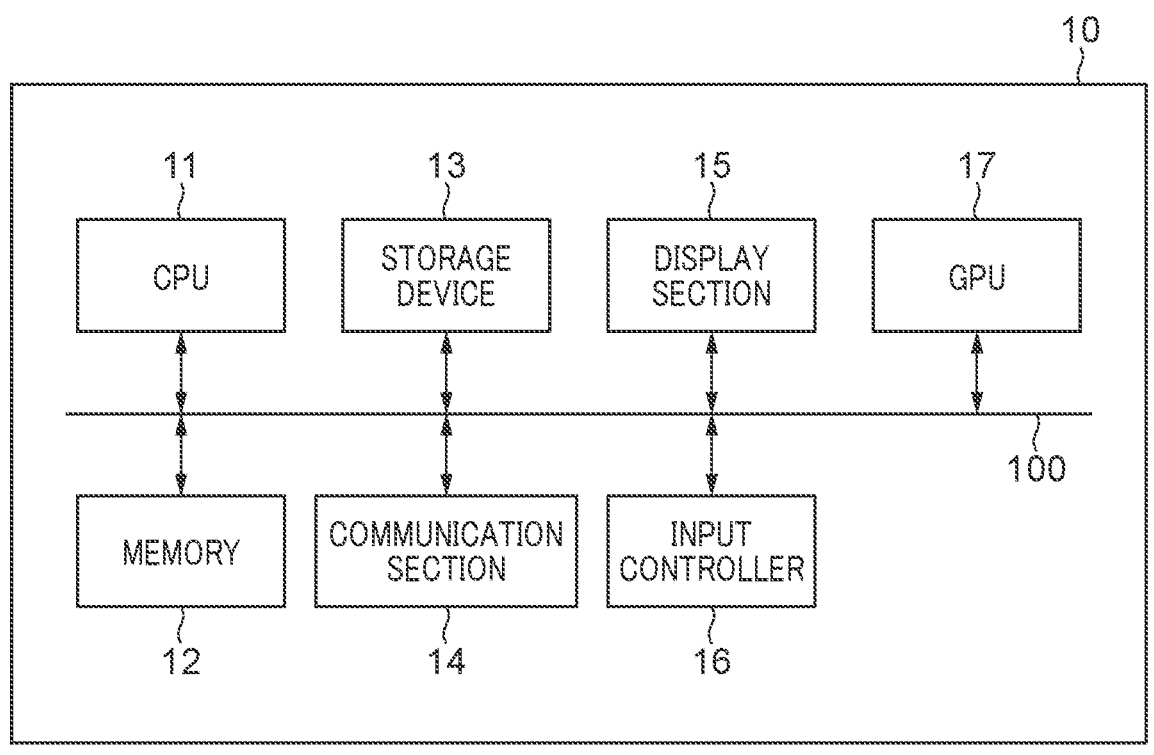
FIG. 1 is a diagram showing an example of a computer.

A first embodiment will now be described in detail below with reference to accompanying drawings. FIG. 1 is a diagram showing an example of a computer 10. The computer 10 corresponds to an information processing apparatus. The computer 10 is e.g. a server. The computer 10 includes a CPU 11, a memory 12, a storage device 13, a communication section 14, a display section 15, an input controller 16, a GPU (Graphics Processing Unit) 17, and an internal bus 100.

The CPU 11 controls the operations of the components (functional blocks) of the computer 10 via the internal bus 100 by executing computer programs stored in the storage device 13. Further, the CPU 11 may perform various calculations alone or in cooperation with the GPU 17. The memory 12 is a rewritable volatile memory. The memory 12 temporarily stores the computer programs for controlling the operations of the components of the computer 10, information on the operations of the computer 10, information obtained before and after processing performed by the CPU 11, and so forth. The following processes may be each realized by the CPU 11 loading a computer program stored in the storage device 13 into the memory 12 and executing the computer program loaded in the memory 12. Further, the processes may be realized by cooperation between the CPU 11 and the CPU 17 through controlling the GPU 17 by the CPU 11. The CPU 11 or the GPU 17 corresponds to a determination unit and a learning unit.

The memory 12 has a sufficient storage capacity to temporarily store various information. In each embodiment, the CPU 11 performs machine learning of a neural network as a learning model. The memory 12 stores computer programs describing details of processing performed by the neural network and learned coefficient parameters (such as weight coefficients and bias values). The weight coefficients are values each indicating strength of connection between nodes in the neural network, and the bias values are values for giving offsets to integrated values of weight coefficients and input data.

The storage device 13 is an electrically erasable and recordable memory, which may be implemented e.g. by a hard disk or an SSD (Solid State Drive). The storage device 13 stores the computer programs for controlling the components of the computer 10, and information, such as processing results temporarily stored in the memory 12. The communication section 14 performs communication with an external apparatus and a peripheral device, such as a recording medium. The communication section 14 may perform wired communication or wireless communication. For example, the communication section 14 may perform wired communication based on the USB (Universal Serial Bus) standard or wireless communication using a method conforming to a wireless communication standard, such as IEEE 802.11.

The display section 15 displays predetermined information. For example, the display section 15 is implemented by a liquid crystal display, an organic EL display, or the like. The display section 15 displays an image based on image signals sent from the CPU 11, the GPU 17, or the like. The input controller 16 receives an input from a predetermined input device. The input device is comprised e.g. of a keyboard, a mouse, and so forth. The input controller 16 converts the contents of an input operation performed using the input device to electrical signals, and transfers the input signals to the components of the computer 10. The GPU 17 performs calculation processing on image signals to be sent to the display section 15, calculation processing of the computer programs, and so forth. Further, the GPU 17 is suitably used for calculation performed when machine learning is performed. The GPU 17 includes circuits that perform calculation processings in parallel at high speed, and hence the GPU 17 can perform calculation processing to be performed by the CPU 11 in place of the CPU 11 depending on the contents of calculation. The functional blocks can be mutually accessed via the internal bus 100.

Next, machine learning will be described. In each embodiment, the computer 10 performs machine learning of a neural network as a learning model. The neural network may be a CNN (Convolutional Neural Network) formed such that convolution layers and pooling layers are alternately layered and a fully connected layer and an output layer are connected thereto. Further, the learning model is not limited to the neural network. For example, the learning model may be a model learned by using a machine learning algorithm, such as a support vector machine. The machine learning of a neural network is realized by optimizing a processing result to be aimed at, by adjusting coefficient parameters, such as weight coefficients and bias values, such that they are made closer to proper values.

In each embodiment, the CPU 11 determines a block dividing pattern of each CTU in HEVC (H. 265) which is a standard of moving image encoding, using a neural network. As a method of calculating a block dividing pattern of each CTU in HEVC, there has been proposed the use of a HEVC Test Model (HM). HM is a model generated by JCT-VC (Joint Collaborative Team on Video Coding). In HM, a huge amount of calculation is performed to determine CU sizes which minimize costs, and an estimation mode.

In each embodiment, the CPU 11 performs the machine learning of a neural network such that block dividing patterns which minimize degradation of image quality of an encoding target image are output. Details of the block dividing pattern will be described hereinafter. The machine learning of a neural network in each embodiment is supervised learning. For teacher data (correct answer data), for example, a block dividing pattern determined by HM, referred to hereinabove, may be used. An encoding target image for learning, associated with the teacher data, is input to the neural network. A combination of the teacher data and the encoding target image for learning is learning data. The CPU 11 performs the machine learning of a neural network using the learning data.

The above-mentioned machine learning is repeatedly performed, whereby the coefficient parameters of the neural network are adjusted. The coefficient parameters adjusted by the machine learning are learned coefficient parameters. When an unknown encoding target image is input, the machine-learned neural network outputs data (output data) indicating block dividing patterns. The machine learning may be performed by the CPU 11 or the GPU 17, or performed by cooperation between the CPU 11 and the GPU 17.

Here, when machine learning for sorting data, such as block dividing patterns in HEVC, which are not sequential values, is performed, in general, calculation of a loss function using a cross entropy error is performed. In a case where the cross entropy error is used as the loss function, the machine learning is performed such that the value of the cross entropy error becomes close to zero. The definition equation of the cross entropy error is expressed by the following equation (1). In the equation (1), "log" represents a natural logarithm with "e" as the base, yx represents an output of the neural network, tx represents an index of the teacher data, and "loss" represents the loss function. The index of the teacher data is equal to 1 when the answer is correct, and is equal to 0 when the answer is incorrect.

$$\text{loss} = -\Sigma_k t_k \log y_k \qquad (1)$$

Figure 2:
FIG. 2 is a diagram showing an example of block dividing patterns.

FIG. 2 is a diagram showing an example of block dividing patterns. In the illustrated example in FIG. 2, the number of the block dividing patterns, denoted by 2a to 2q, is 17. However, the number of block dividing patterns is not limited to 17. Further, the method of dividing a block to determine a block dividing pattern is not limited to the illustrated example in FIG. 2. In FIG. 2, it is assumed that the block dividing pattern 2a is teacher data. In this case, the machine learning of a neural network is performed such that the probability that output data from the neural network becomes the block dividing pattern 2a becomes high. That is, the block dividing pattern itself output from the neural network is not considered, but only the probability that the output data from the neural network becomes the block dividing pattern 2a is reflected on the machine learning.

For example, in FIG. 2, a block dividing pattern 2b is most similar to the block dividing pattern 2a as the teacher data. On the other hand, the block dividing pattern 2q is least similar to the block dividing pattern 2a as the teacher data. At this time, let it be assumed that the neural network has output data indicating that both of the probability that the block dividing pattern 2b is the block dividing pattern 2a and the probability that the block dividing pattern $2q$ is the block dividing pattern $2a$ are the same value. In this case, although the block dividing pattern $2b$ and the block dividing pattern $2q$ are largely different in similarity to the block dividing pattern $2a$, the machine learning of the neural network is performed using the same loss error.

To cope with this problem, in the present embodiment, when machine learning of a neural network is performed, the CPU 11 weights, i.e. assigns a weight to a loss error, such as a cross entropy error. The CPU 11 weights a loss error according to a combination of output data from the neural network and the teacher data. This makes it possible to increase the probability that a block dividing pattern similar to the teacher data (correct answer data) is output from the neural network. As a result, in the present embodiment, compared with a case where a loss error is not weighted, it is possible to improve the quality of images of a moving image, which are decoded after being encoded for compression.

Figure 3A:
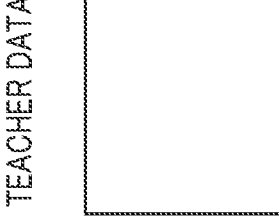
FIGS. 3A and 3B are diagrams showing a relationship between teacher data and a similar group of block dividing patterns which are different in dividing pattern from the teacher data with respect to one section, in a first embodiment.
Figure 3A:
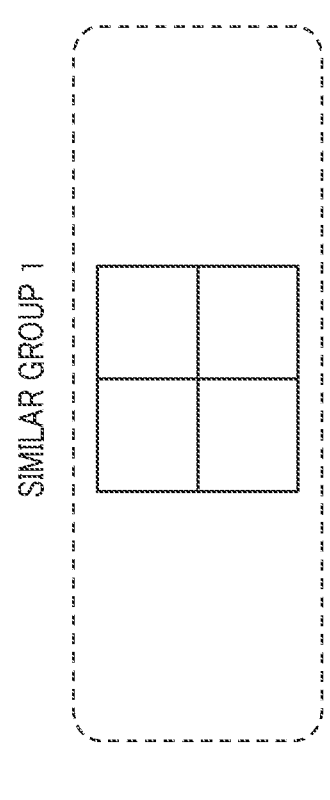
Figure 3B:
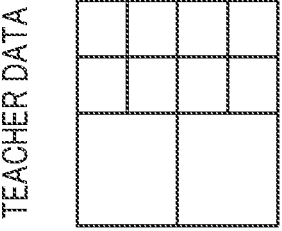
Figure 3B:
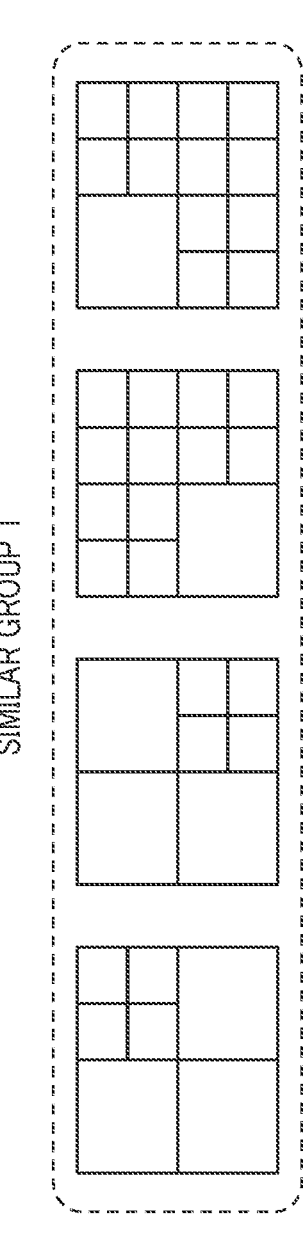

Next, how weighing of the loss function is performed will be described. FIGS. 3A and 3B are diagrams showing a relationship between teacher data and a similar group of block dividing patters which are different in dividing pattern from the teacher data with respect to one section, in the first embodiment. In the illustrated example in FIGS. 3A and 3B, a block dividing pattern of a similar group 1 is a block dividing pattern different from the block dividing pattern of the teacher data with respect to one section. FIG. 3A is a diagram showing a first example of the relationship between the teacher data and the similar group in a case where the dividing pattern is different with respect to one section, in the first embodiment. FIG. 3A shows the similar group 1 in a case where the teacher data is the block dividing pattern $2a$ appearing in FIG. 2. The block dividing pattern different from the block dividing pattern $2a$ appearing in FIG. 2 with respect to one section is the block dividing pattern $2b$.

FIG. 3B is a diagram showing a second example of the relationship between the teacher data and the similar group in the case where the dividing pattern is different with respect to one section, in the first embodiment t. FIG. 3B shows the similar group 1 in a case where the teacher data is a block dividing pattern $2j$ appearing in FIG. 2. The block dividing patterns different from the block dividing pattern $2j$ appearing in FIG. 2 with respect to one section are four block dividing patterns $2d$, $2f$, $2n$ and $2o$. In a case where a block dividing pattern output from the neural network (the block dividing pattern having the highest probability) is different from the teacher data with respect to one section, the CPU 11 defines the similar group 1. Further, the CPU 11 defines a weight to be assigned to the loss function with respect to each block dividing pattern belonging to the similar group 1 as $w_1$.

Figures 4A, 4B:
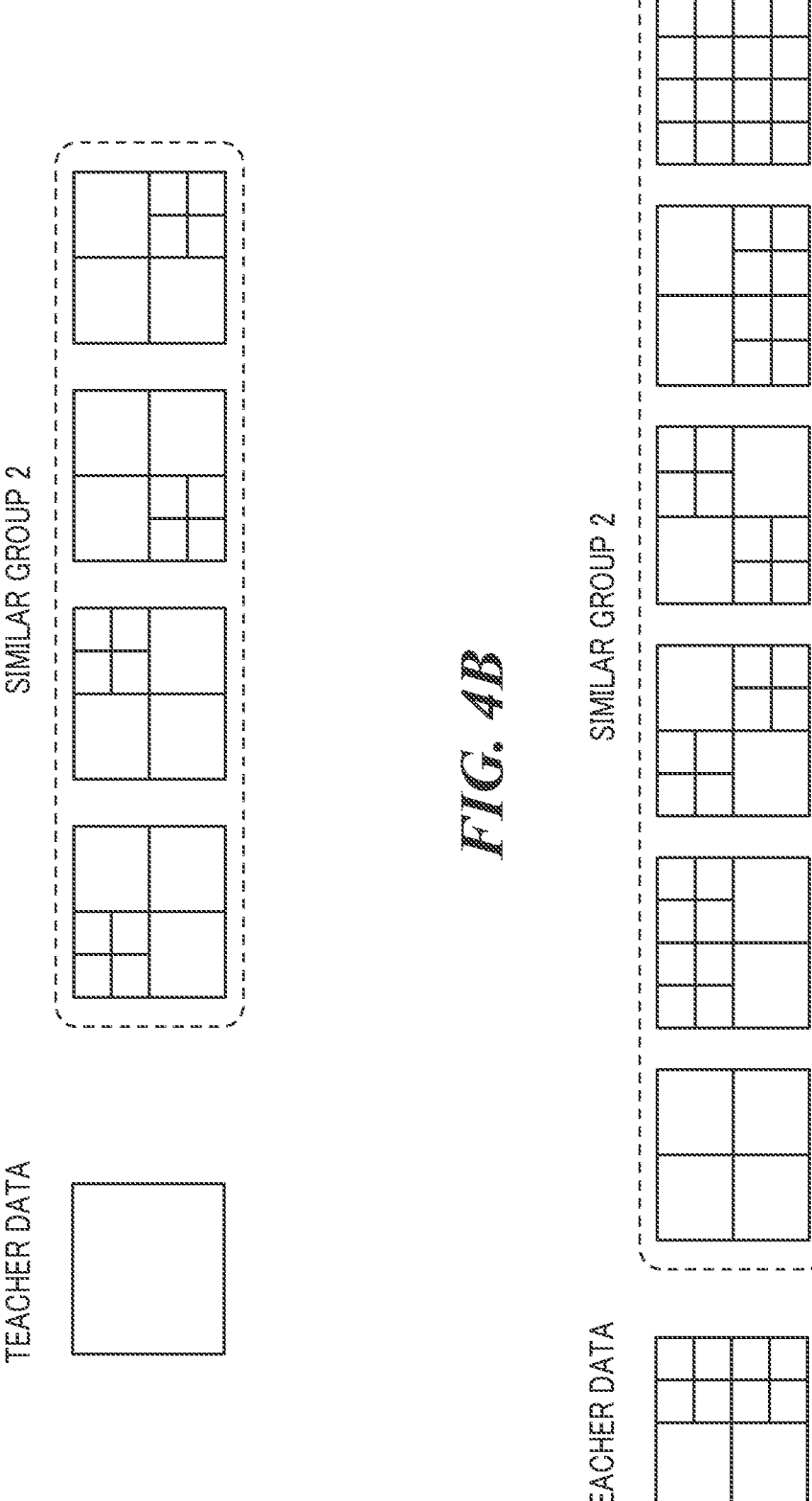
FIGS. 4A and 4B are diagrams showing a relationship between teacher data and a similar group of block dividing patterns which are different in dividing pattern from the teacher data with respect to two sections, in the first embodiment.

FIGS. 4A and 4B are diagrams showing a relationship between teacher data and a similar group of block dividing patterns which are different in dividing pattern with respect to two sections, in the first embodiment. The block dividing patterns of a similar group 2 are each different from the block dividing pattern of the teacher data with respect to two sections. FIG. 4A is a diagram showing a first example of the relationship between the teacher data and the similar group in a case where the dividing pattern is different with respect to two sections, in the first embodiment. The teacher data is the block dividing pattern $2a$ appearing in FIG. 2. Further, the block dividing patterns different from the block dividing pattern $2a$ with respect to two sections are four block dividing patterns $2c$, $2d$, $2e$, and $2f$ appearing in FIG. 2. FIG. 4B is a diagram showing a second example of the relationship between the teacher data and the similar group in the case where the dividing pattern is different with respect to two sections, in the first embodiment. The teacher data is the block dividing pattern $2j$ appearing in FIG. 2. The block dividing patterns different from the block dividing pattern $2j$ with respect to two sections are six block dividing patterns $2b$, $2g$, $2i$, $2k$, $2l$, and $2q$. In a case where a block dividing pattern output from the neural network (the block dividing pattern having the highest probability) is different from the teacher data with respect to two sections, the CPU 11 defines the similar group 2. Further, the CPU 11 defines a weight to be assigned to the loss function with respect to each block dividing pattern belonging to the similar group 2 as $w_2$.

Similarly, in a case where a block dividing pattern output from the neural network, which has the highest probability, is different from the teacher data with respect to three sections, the CPU 11 defines a similar group 3. At this time, the CPU 11 defines a weight $w_3$ to be assigned to the loss function with respect to each block dividing pattern belonging to the similar group 3. In a case where a block dividing pattern output from the neural network, which has the highest probability, is different from the teacher data with respect to four sections, the CPU 11 defines a similar group 4. At this time, the CPU 11 defines a weight $w_4$ to be assigned to the loss function with respect to each block dividing pattern belonging to the similar group 4. In a case where a block dividing pattern output from the neural network, which has the highest probability, is different from the teacher data with respect to five sections, the CPU 11 defines a similar group 5. At this time, the CPU 11 defines a weight $w_5$ to be assigned to the loss function with respect to each block dividing pattern belonging to the similar group 5. Thus, the CPU 11 determines a similar group according to the number of different sections between the block dividing pattern of teacher data and a block dividing pattern output from the neural network.

Further, there is a case where a block dividing pattern output from the neural network, which has the highest probability, completely matches the block dividing pattern of teacher data. In this case, the CPU 11 defines a similar group 0 and defines a weight to be assigned to the loss function as $w_0$.

The weights $w_0$ to $w_5$ defined by the CPU 11 have a relationship expressed by the following expression (2):

$$w_0 \leq w_1 \leq w_2 \leq w_3 \leq w_4 \leq w_5 \tag{2}$$

Further, the above expression may be the following expression (3) or (4):

$$1 = w_0 \leq w_1 \leq w_2 \leq w_3 \leq wA \leq w_5 \tag{3}$$

$$w_0 \leq w_1 \leq w_2 \leq w_3 \leq w_4 \leq w_5 = 1 \tag{4}$$

In the case of the expression (3), when the weight $w_0$ is defined, the CPU 11 is not required to weight the loss function with respect to each block dividing pattern belonging to the similar group 0. Further, in the case of the expression (4), when the weight $w_5$ is defined, the CPU 11 is not required to weight the loss function with respect to each block dividing pattern belonging to the similar group 5.

The similarity between each block dividing pattern belonging to the similar group 0 and teacher data is the highest. On the other hand, the similarity between each block dividing pattern belonging to the similar group 5 and teacher data is the lowest. That is, the CPU 11 determines a weight such that the loss function becomes smaller as the similarity between a block dividing pattern output from the neural network and teacher data is higher. On the other hand, the CPU 11 determines the weight such that the loss function becomes larger as the above-mentioned similarity is lower. Although in the above-described example, the description is given of the example in which the similar group is defined according to the number of sections different from the block dividing pattern of teacher data, the CPU 11 may define the similar group giving a higher priority to a hierarchical structure of dividing patterns than the number of sections.

Figure 5:
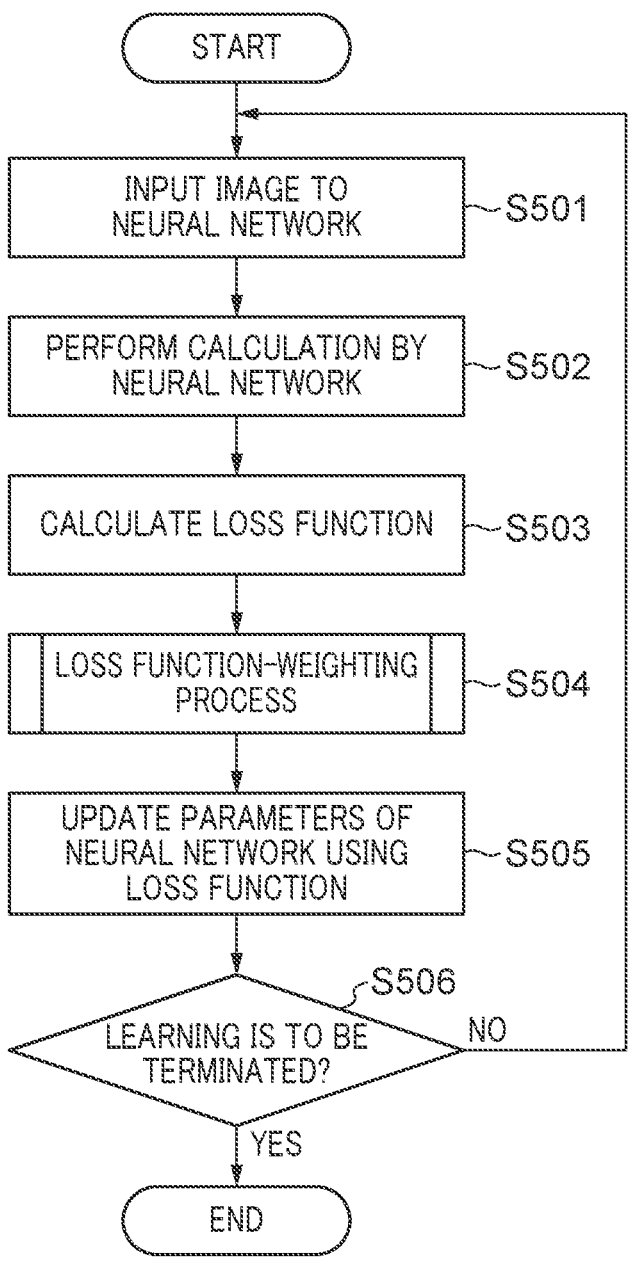
FIG. 5 is a flowchart of a learning process.

Next, a learning process will be described. FIG. 5 is a flowchart of the learning process of the present embodiment. In a step S501, the CPU 11 inputs an image (encoding target image) to the neural network. In each embodiment, the encoding target image is an image forming a moving image, and is encoded for compression e.g. with HEVC. In a step S502, the CPU 11 calculates coefficient parameters of the neural network using the encoding target image as an input. In a step S503, the CPU 11 calculates a loss function using a calculation result output from the neural network. In a step S504, the CPU 11 performs a loss function-weighting process. Details of the loss function-weighting process in the step S504 will be described hereinafter. In a step S505, the CPU 11 updates the coefficient parameters of the neural network using the loss function. Next, in a step S506, the CPU 11 determines whether or not to terminate the learning process. If the answer to the question of the step S506 is negative (NO), the CPU 11 returns to the step S501. On the other hand, if the answer to the question of the step S506 is affirmative (YES), the CPU 11 terminates the learning process. For example, when the number of times of learning reaches a predetermined number, the CPU 11 may determine that the answer to the question of the step S506 is affirmative (YES).

Figure 6:
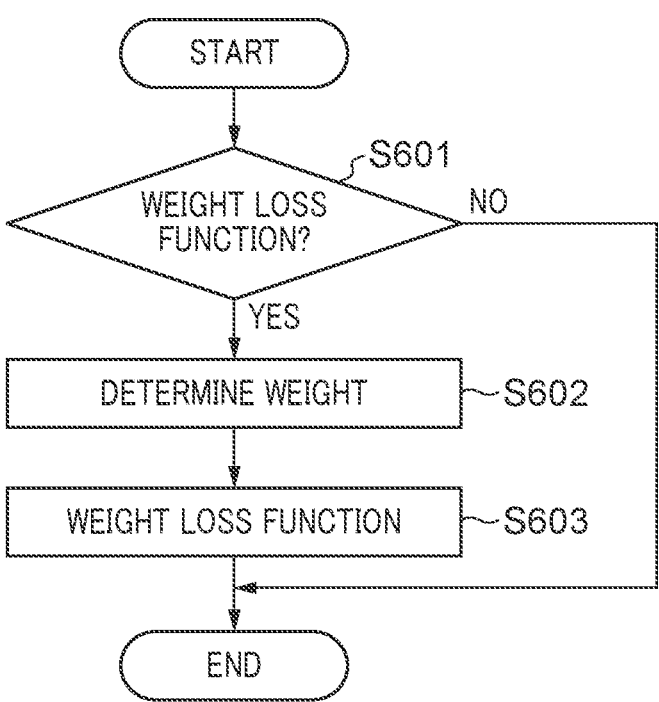
FIG. 6 is a flowchart of a loss function-weighting process.

Next, the loss function-weighting process in the step S504 will be described. FIG. 6 is a flowchart of the loss function-weighting process. In a step S601, the CPU 11 determines whether or not to weight the loss function. For example, in a case where a setting of whether or not to weight the loss function has been made in advance, the CPU 11 may perform the determination in the step S601 based on the setting. If the answer to the question of the step S601 is negative (NO), the CPU 11 terminates the loss function-weighting process. On the other hand, if the answer to the question of the step S601 is affirmative (YES), the CPU 11 proceeds to a step S602. In the step S602, the CPU 11 determines a similar group to which a result output from the neural network belongs and a weight associated with the determined similar group, based on a block dividing pattern output from the neural network and the block dividing pattern of teacher data. In the above-described example, the CPU 11 determines one of the weights $w_0$ to $w_5$ associated with the similar groups 0 to 5 as the weight w.

In a step S603, the CPU 11 weights the loss function with the weight determined in the step S602. The CPU 11 weights the loss function by multiplying the loss function "loss" by the value "w" of the weight using the following equation (5). The loss function "loss" can be determined by the above equation (1).

$$weighted\_loss = w \times loss \qquad (5)$$

After executing the step S603, the CPU 11 terminates the loss function-weighting process. The loss function-weighting process in FIG. 6 is performed whenever the learning process in FIG. 5 is performed.

As described above, the CPU 11 compares the block dividing pattern of teacher data and a block dividing pattern output from the neural network and defines a similar group. Then, the CPU 11 weights the loss function with a value of weight determined according to the similar group, and performs machine learning of the neural network using the weighted loss function. By performing the machine learning of the neural network using the weighted loss function, the neural network increases the rate of outputting a block dividing pattern closer to the block dividing pattern of teacher data. Therefore, compared with a case where the loss function is not weighted, it is possible to improve the image quality of an image encoded for compression.

With the above-described processes, the CPU 11 performs the machine learning of a neural network, whereby a neural network (learned neural network) of which the coefficient parameters have been adjusted is generated. The CPU 11 may perform inference processing using the learned neural network. For example, the CPU 11 can encode an image forming a moving image using the neural network described above. In doing this, the CPU 11 inputs an unknown image (image forming the moving image) to the learned neural network. Then, the CPU 11 encodes the unknown image using a block dividing pattern output from the learned neural network.

Further, encoding of an unknown image using the learned neural network may be performed by another information processing apparatus (such as a smartphone, a tablet terminal, and an image capturing apparatus) different from the computer 10. In this case, the other information processing apparatus may communicate with the computer 10 to acquire the learned neural network therefrom and encode the unknown image.

Next, a second embodiment will be described. In the second embodiment, the CPU 11 updates a weight assigned to the loss function in accordance with progress of the machine learning of a neural network. The computer 10 according to the second embodiment has the same configuration as that of the first embodiment. In the following description, description of the same components as those of the first embodiment is omitted. In the second embodiment, similar to the first embodiment, the CPU 11 divides an encoding target image using 17 block dividing patterns. Then, in the second embodiment, the values of the weights $w_0$ to $w_5$ in the expressions (2) to (4) are updated in accordance with progress of the neural network machine learning.

Figure 7:
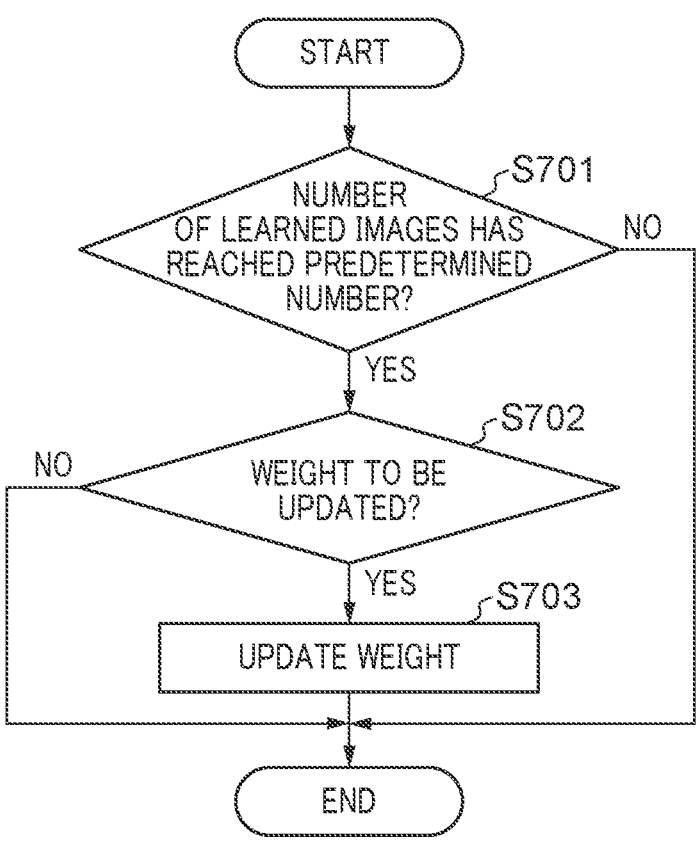
FIG. 7 is a flowchart of a process for updating a weight assigned to a loss function in a second embodiment.

FIG. 7 is a flowchart of a process for updating the weight assigned to the loss function in the second embodiment. In a step S701, the CPU 11 determines whether or not the number of images subjected to the machine learning (the number of learned images) has reached a predetermined number. The predetermined number may be a number set in advance or may be a number determined based on a degree of convergence of learning. Further, the predetermined number may be set by another desired method. If the answer to the question of the step S701 is negative (NO), the CPU 11 terminates the process in FIG. 7. On the other hand, if the answer to the question of the step S701 is affirmative (YES), the CPU 11 proceeds to a step S702.

In the step S702, the CPU 11 determines whether or not each of the weights $w_0$ to $w_5$ is to be updated. In the present embodiment, the CPU 11 determines whether or not the weight is to be updated, based on the similarity between the block dividing pattern of teacher data and a block dividing pattern output from the neural network. However, the determination of whether or not the weight is to be updated may be performed by a desired method. The CPU 11 updates a weight so as to reduce the value of the weight such that as the above-mentioned similarity is higher, the value of the weighted loss function becomes smaller. Further, the CPU 11 updates a weight so as to increase the value of the weight such that as the above-mentioned similarity is lower, the value of the weighted loss function becomes larger.

For example, in a case where the predetermined similar group used as a reference is set to the similar group 2, when increasing the values of weights to update the weights, the CPU 11 increases the weights $w_3$ to $w_5$ associated with the similar groups 3 to 5 other than the similar groups 0 to 2. On the other hand, when reducing the values of weights to update the weights, the CPU 11 updates the weights $w_0$ to $w_2$ associated with the similar groups 0 to 2. Weights to be updated may be either or both of weights to be updated by increasing the values thereof and weights to be updated by reducing the values thereof. If there is no weight to be updated, the CPU 11 determines that the answer to the question of the step 702 is negative (NO) and terminates the process in FIG. 7. On the other hand, if there is/are weights to be updated, the CPU 11 proceeds to a step S703.

In the step S703, the CPU 11 updates the weight(s). In a case where the weight(s) is/are to be updated by increasing the value(s) thereof, the CPU 11 multiplies the value of each weight by a predetermined multiplication factor (number of times by which the weight is increased) so as to increase the value of the weight. Further, in a case where the weight(s) is/are to be updated by reducing the value(s) thereof, the CPU 11 multiplies the value of each weight by a predetermined multiplication factor (number of times by which the weight is reduced) so as to reduce the value of the weight. The CPU 11 may add or subtract a desired value to or from the value of a weight to be updated. Here, in the case where the weight(s) are to be updated by reducing the values thereof (in a case where the similarity is not lower than a predetermined value), the CPU 11 may multiply the value of each weight by 0. In this case, the weight to be updated becomes equal to 0. The predetermined value is associated with the above-mentioned predetermined similar group used as the reference. After executing the step S703, the CPU 11 terminates the process in FIG. 7. The CPU 11 executes the step S603, i.e. weights the loss function using the updated weight(s).

In the second embodiment, the CPU 11 determines a weight whenever the number of learned images reaches a predetermined number. That is, the CPU 11 updates the weight to be assigned to the loss function in accordance with progress of the machine learning. This makes it possible to increase the weight assigned to the loss function with respect to a block dividing pattern largely different from the block dividing pattern of teacher data in an intermediate stage of the machine learning. As a result, when the machine learning of the neural network is performed, it is possible to increase influence of a block dividing pattern largely different from the block dividing pattern of the teacher data, on the machine learning. Therefore, it is possible to further increase a rate at which the neural network outputs a block dividing pattern similar to the block dividing pattern of the teacher data.

Next, a third embodiment will be described. In the third embodiment, the CPU 11 changes a weight to be assigned to the loss function even when a block dividing pattern is determined as one belonging to the same similar group (group of block dividing patterns having the same degree of similarity). However, there is also a case where the CPU 11 does not change the weight. The computer 10 according to the third embodiment has the same configuration as that of the first embodiment. In the following description, description of the same components as those of the first embodiment is omitted.

Figure 8:
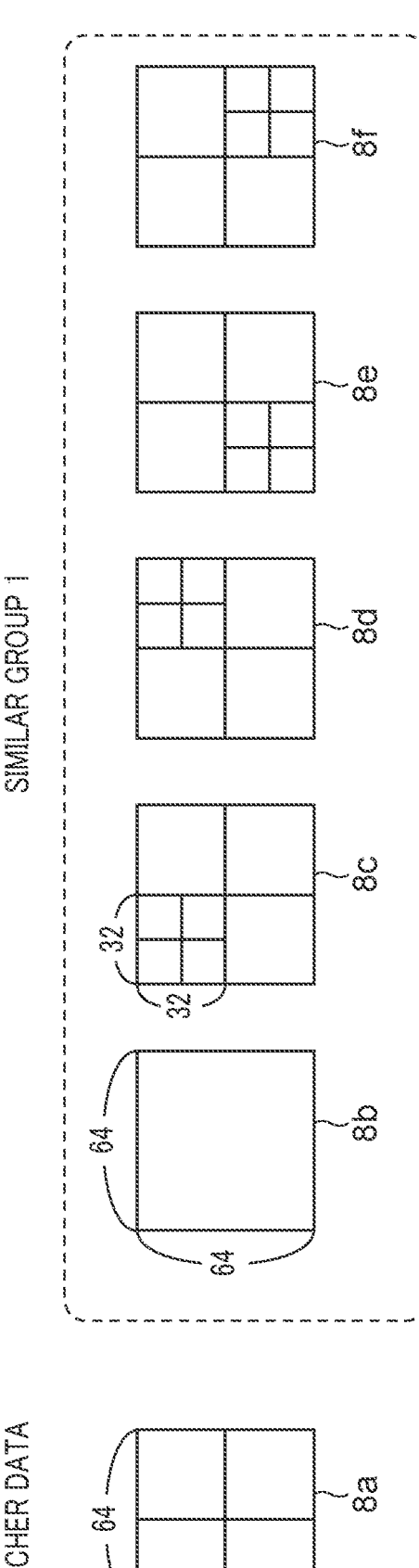
FIG. 8 is a diagram showing a relationship between teacher data and a similar group of block dividing patterns which are different in dividing pattern from the teacher data with respect to one section, in a third embodiment.

FIG. 8 is a diagram showing a relationship between teacher data and a similar group of block dividing patterns which are different in dividing pattern with respect to one section, in the third embodiment. A block dividing pattern 8b out of the five block dividing patterns belonging to the similar group 1 appearing in FIG. 8 is different in weight from the other four block dividing patterns 8c to 8f. A plurality of block dividing patterns belonging to the same similar group may be all different in weight. In the illustrated example in FIG. 8, the block dividing patterns of the similar group 1, which are output from the neural network, are different in one section from the block dividing pattern of teacher data. In this case, the five block dividing patterns 8b to 8f belong to the similar group 1.

The block dividing pattern, denoted by reference numeral 8a, of the teacher data and the block dividing patterns 8b to 8f belonging to the similar group 1 each are the dividing pattern of an image block having a size of 64×64 pixels vertically and horizontally. Here, the block dividing patterns 8b to 8f are common in that the block dividing pattern is different in one section from the block dividing pattern 8a of the teacher data. On the other hand, the block dividing patterns 8c to 8f are different from the block dividing pattern 8a of the teacher data with respect to a block having a size of 32×32 pixels vertically and horizontally, but the block dividing pattern 8b is different from the block dividing pattern 8a with respect to a block having a size of 64×64 pixels vertically and horizontally. That is, the block size of a block different from the block dividing pattern 8a of the teacher data is different between the block dividing pattern 8a and the block dividing patterns 8c to 8f.

There is a case where even the block dividing patterns belonging to the same similar group are sometimes different in the block size of a section different from the block dividing pattern 8a of the teacher data, i.e. different in the hierarchical level of minimum division. In view of this, the CPU 11 weights the loss function using a different weight according to the block size of the section different from the block dividing pattern 8a, with respect to the plurality of block dividing patterns belonging to the similar group 1. In the illustrated example in FIG. 8, the CPU 11 defines a weight $w_{1L}$ for weighting the loss function with respect to the block dividing pattern 8b and defines a weight $w_{1S}$ for weighting the loss function with respect to the block dividing patterns 8c to 8f. A relationship expressed by the following expression (6) holds between the weight $w_{1L}$ and the weight $w_{1S}$:

$$w_{1S} \geq w_{1L} \tag{6}$$

Further, a relationship expressed by the following expression (7) or (8) may hold between the weight $w_{1L}$ and the weight $w_{1S}$:

$$w_0 \leq w_{1S} \leq w_{1L} = w_1 \tag{7}$$

$$w_1 = w_{1S} \leq w_{1L} \leq w_1 \tag{8}$$

In the case of the expression (7) or (8), by defining one weight anew, the CPU 11 can define different weights with respect to the plurality of block dividing patterns belonging to the same similar group.

In the third embodiment, the CPU 11 makes the weight to be assigned to the loss function different according to the block size of the divided block, with respect to the plurality of block dividing patterns belonging to the similar group associated with the similarity with the teacher data. With this, even when a block dividing pattern belongs to the same similar group, it is possible to increase the weight to be assigned to the loss function with respect to a block dividing pattern supposed to have an influence on the image quality of an image decoded after being compressed by encoding. Therefore, it is possible to increase the rate at which the neural network outputs a block dividing pattern close to the teacher data, and suppress degradation of the image quality of an image decoded after being compressed by encoding.

Here, HEVC employs a hierarchical structure and as the hierarchical level is deeper, the block size is smaller. For example, in the CTU, a block having a size of 64×64 pixels vertically and horizontally is a block which is the shallowest in depth, and a block having a size of 8×8 pixels vertically and horizontally is a block which is the deepest in depth (the divided block of the maximum depth). Therefore, the CPU 11 may determine the similarity according to a difference in depth in the hierarchical structure between the block dividing pattern of teacher data and a block dividing pattern output from the neural network. In this case, the CPU 11 determines the similarity such that as the difference in depth in the hierarchical structure is larger, the similarity is higher, and as the difference in depth is smaller, the similarity is lower.

Further, in the above-described embodiments, the CPU 11 determines a similarity according to the number of sections different between the block dividing pattern of teacher data and a block dividing pattern output from the neural network. In doing this, the CPU 11 may determine the similarity by giving a higher priority to the difference in depth in the hierarchical structure than the number of the above-mentioned sections, or may determine the similarity by giving a higher priority to the number of the above-mentioned sections than the difference in depth.

Further, although in the above-described embodiments, the description is given of determination of a dividing pattern, which is performed when encoding an image forming a moving image, the embodiments may be applied to a case where a predetermined image is divided according to a desired pattern.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-069286 filed Apr. 7, 2020, which is hereby incorporated by reference herein in its entirety.

What is claimed is:

1. An apparatus comprising:
at least one processor; and
at least one memory coupled to the at least one processor, the at least one memory having instructions that, when executed by the at least one processor, perform the operations as:
a determination unit configured to determine a weight based on a similarity between a dividing pattern output from a learning model that outputs, using an image for learning as an input thereto, a dividing pattern obtained by dividing the image, and teacher data being used for performing machine learning of the learning model; and
a learning unit configured to:
generate a learned model by performing machine learning of the learning model using a loss function weighted by the determined weight,
wherein the similarity is determined by counting a number of sections of the dividing pattern output from the learning model, which differ from a dividing pattern of the teacher data;
and encode an unknown image forming a moving image using a block dividing pattern output from the learned model, such that a probability that the block dividing pattern output from the learned model is similar to the output teacher data is increased.

2. The apparatus according to claim 1, wherein the determination unit determines the weight such that as the similarity is higher, the loss function becomes smaller.

3. The apparatus according to claim 2, wherein in a case where the similarity is not lower than a predetermined value, the determination unit determines the weight as 0.

4. The apparatus according to claim 1, wherein the determination unit determines the weight such that as the similarity is lower, the loss function becomes larger.

5. The apparatus according to claim 1, wherein the determination unit determines the weight whenever a number of images input to the learning model for learning reaches a predetermined number.

6. The apparatus according to claim 1, wherein the determination unit makes the weight different with respect to a plurality of dividing patterns output from the learning model, which belong to a group of dividing patterns having the same similarity, according to a block size of a block different from the teacher data.

7. The apparatus according to claim 1, wherein the similarity is determined further according to a difference in depth in a hierarchical structure when dividing the image into blocks.

8. The apparatus according to claim 7, wherein the similarity is determined by giving priority to one of the number of sections and the difference in depth.

9. The apparatus according to claim 1, wherein the image for learning is an image forming a moving image to be encoded by a standard of HEVC.

10. The apparatus according to claim 1, wherein the apparatus encodes, using a block dividing pattern which the learning model outputs using an unknown image as an input, the unknown image.

11. A method comprising:

determining a weight based on a similarity between a dividing pattern output from a learning model that outputs, using an image for learning as an input thereto, a dividing pattern obtained by dividing the image, and teacher data being used for performing machine learning of the learning model;

generating a learned model by performing machine learning of the learning model using a loss function weighted by the determined weight, wherein the similarity is determined by counting a number of sections of the dividing pattern output from the learning model, which differ from a dividing pattern of the teacher data;

and encoding an unknown image forming a moving image using a block dividing pattern output from the learned model, such that a probability that the block dividing pattern output from the learned model is similar to the output teacher data is increased.

12. The method according to claim 11, wherein said determining includes determining the weight such that as the similarity is higher, the loss function becomes smaller.

13. The method according to claim 12, wherein the determining includes determining, in a case where the similarity is not lower than a predetermined value, the weight as 0.

14. The method according to claim 11, wherein the determining includes determining the weight whenever a number of images input to the learning model for learning reaches a predetermined number.

15. The method according to claim 11, wherein determining includes determining making the weight different with respect to a plurality of dividing patterns output from the learning model, which belong to a group of dividing patterns having the same similarity, according to a block size of a block different from the teacher data.

16. The method according to claim 11, wherein the similarity is determined further according to a difference in depth in a hierarchical structure when dividing the image into blocks.

17. The method according to claim 16, wherein the similarity is determined by giving priority to one of the number of sections and the difference in depth.

18. A non-transitory computer-readable storage medium storing a program for causing a computer to execute a method, the method comprising:

determining a weight based on a similarity between a dividing pattern output from a learning model that outputs, using an image for learning as an input thereto, a dividing pattern obtained by dividing the image, and teacher data being used for performing machine learning of the learning model;

generating a learned model by performing machine learning of the learning model using a loss function weighted by the determined weight, wherein the similarity is determined by counting a number of sections of the dividing pattern output from the learning model, which differ from a dividing pattern of the teacher data;

and encoding an unknown image forming a moving image using a block dividing pattern output from the learned model, such that a probability that the block dividing pattern output from the learned model is similar to the output teacher data is increased.

* * * * *